F. P. BERGH.
EVAPORATING OR CONCENTRATING PROCESS.
APPLICATION FILED JAN. 10, 1912. RENEWED FEB. 23, 1917.
1,249,001. Patented Dec. 4, 1917.
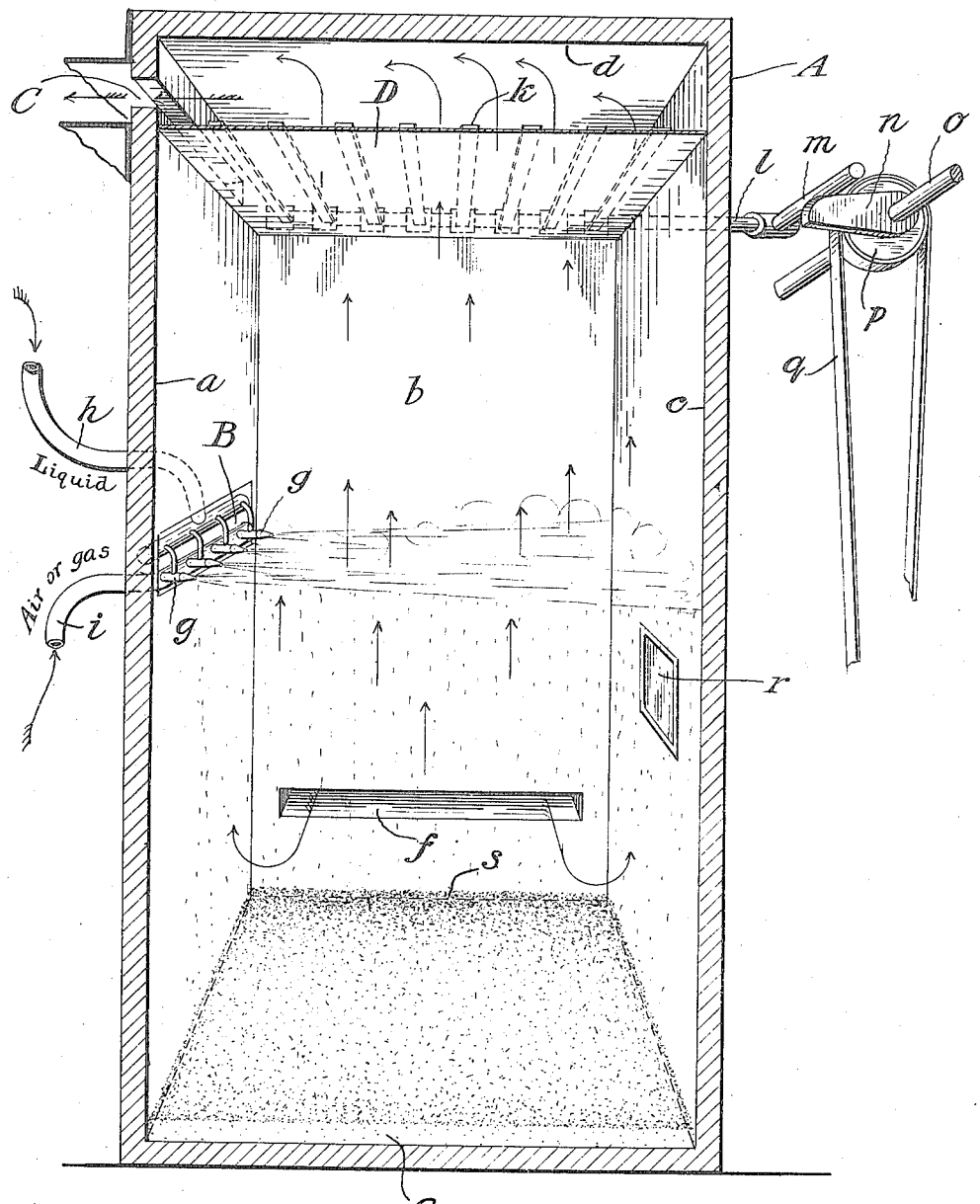
WITNESSES:
J. F. Mothershead
M. E. Freeman
INVENTOR
Frederick P. Bergh
By Griffin & Bernhard
ATTORNEYS.

UNITED STATES PATENT OFFICE.

FREDERICK P. BERGH, OF YONKERS, NEW YORK, ASSIGNOR TO GENERAL REDUCTION COMPANY.

EVAPORATING OR CONCENTRATING PROCESS.

1,249,001.      Specification of Letters Patent.      Patented Dec. 4, 1917.

Application filed January 10, 1912, Serial No. 670,380. Renewed February 23, 1917. Serial No. 150,619.

*To all whom it may concern:*

Be it known that I, FREDERICK P. BERGH, a citizen of the United States, residing in Yonkers, county of Westchester, and State of New York, have invented a certain new and useful Evaporating or Concentrating Process, of which the following is a specification.

This invention is an evaporating or concentrating process, and the main object of the invention, broadly stated, is to economically and efficiently evaporate substances in solution, suspension or emulsion, for the purpose, principally, of recovering the solid constituent or constituents therefrom in a dry, amorphous or crystalline form. It is particularly adapted for evaporating such substances as milk, saline solutions, starch, in suspension, sugar solutions and glucose. In the preferred way of practising the invention, the solids are recovered in the same chamber wherein the evaporation is effected. The invention is adapted, also, for concentrating or partially evaporating substances in solution, suspension, or emulsion.

With the foregoing objects in view, I inject the solution or liquid to be evaporated or concentrated into a suitable chamber in a state of subdivision, *i. e.*, in the form of a spray, vapor or mist, as distinguished from solid streams or drops. Moreover, I project the vapor or spray in the form of a layer, stratum, film, or sheet across the chamber, or to the middle from opposing sides of the chamber, preferably in a horizontal or substantially horizontal direction.

The evaporation or dehydration is effected by means of air, or other gaseous body, which may be heated or otherwise, and which is also projected into the evaporating chamber in a horizontal layer or stratum positioned below the stratum of vapor or spray. The air inlet to the chamber is positioned at a different side of the chamber from the vapor or spray inlet, and, speaking generally, I prefer to project the air, in a path substantially at right angles to the path of the vapor or spray.

It is the aim to introduce the material to be dehydrated into the apparatus in such an attenuated condition that the body of air introduced below it rises up through said material without appreciable disturbance in the body of air as a whole.

The air is introduced into the chamber at such velocity or pressure that the stratum extends across the chamber and yet without the air striking or impacting against the side of the chamber, opposite to that at which it is introduced, whereby rebounding or eddying is practically precluded. Substantially the same conditions are observed in introducing the layer or stratum of vapor or spray into the chamber and for the same reason.

The strata of air and vapor or spray having been introduced into the chamber as described, the air rises gradually, and, with little or no disturbance in its mass as a whole, comes into gentle contact with the stratum of vapor or spray, quickly depriving the latter of its moisture, then passing, laden with moisture, out of the apparatus. The particles in solution having been deprived of their moisture, *i. e.*, thrown out of solution, gradually fall to the bottom or floor of the chamber, and, if this be horizontal, accumulate on all parts thereof at a substantially uniform depth, thereby showing that dehydration takes place uniformly throughout the entire cross sectional area of the evaporating chamber, and that there is no appreciable disturbance in the downward paths of the dried particles.

Some of the dehydrated particles, however, are so light or impalpable that they float, or are carried upwardly by the rising air, and would, to some considerable extent, be carried out of the chamber by the outgoing air current. To preclude this result, and to cause all, or substantially all, of the dehydrated particles to be deposited in the evaporating chamber, I so position a very fine mesh screen or filter, preferably within the chamber, that all the solid particles carried by the outgoing current are separated therefrom. In the event the screen or filter is positioned within the evaporating chamber, said particles are either precipitated to the bottom of the chamber, or remain attached to the screen or filter, from which they can be separated by suitable beaters thereby enabling substantially all the solid content of the solution or emulsion being treated to be collected in the evaporating chamber. The filter or screen, therefore, is a very important factor in the efficient and economical operation of the apparatus.

The filter or screen is preferably composed of a textile fabric, burlap being particularly adapted for the purpose, and I may use from one to three plies thereof, depending on the material being treated and the particular conditions of operation.

The filter or screen not only serves to retain the solid particles, as described, but it has other pronounced advantages in the dehydration process proper in that it precludes the spray or vapor, prior to its separation from the solid particles, from rising above a certain height in the evaporating chamber, retards the outgoing current, and avoids a too sudden in-rush of air, or gas to the chamber, all of which effects are contributing factors in the more thorough and extended commingling of the spray or vapor with the heated air, and resulting in a more expeditious and complete drying of the solid particles.

In the accompanying drawing I have illustrated one form of apparatus which I have successfully used in practising the process, but said apparatus is to be regarded as merely typical, and not exclusive, of the apparatus which may be used in carrying out the process.

The drawing shows the apparatus in perspective, sectional elevation.

A designates the evaporating chamber as a whole, one of the side walls being cut away, leaving the front wall $a$, back wall $b$, side wall $c$, top or ceiling $d$, and floor $e$. The warm air inlet slot or opening, extending substantially the entire depth of the chamber, is indicated at $f$, and the vaporizer at B.

The atomizer or vaporizer B may be of any suitable type, the object thereof being to introduce the liquid into the chamber as a stratum or sheet of spray or vapor as heretofore described. The particular form illustrated consists of a plurality of nozzles $g$ which are supplied by liquid, either by gravity or under pressure, from a liquid main $h$, said liquid being converted into vapor or spray by compressed air or gas entering nozzles $g$ from a common supply pipe $i$.

The outlet C to the evaporating chamber is shown in the form of a slot located in the same side of the chamber as that from which the sheet of vapor or spray is projected. As shown, the exit slot extends substantially the entire width of the chamber.

D is the screen or filter, and it consists, preferably, of one or more layers of burlap extending entirely across the evaporating chamber, and just below the exit C, whereby the outgoing air or gas is compelled to pass through it. As heretofore stated this screen or filter separates from the outgoing current, by deflecting them downwardly, or collecting them on its under surface, or in its meshes, any solid particles which were carried upwardly by the dehydrating air or gas current. In this manner substantially all the solid constituents of the liquid operated upon are retained in the evaporating chamber and in an exceptionally fine, dry condition. This screen also performs the other important functions to which reference has been made.

In order to dislodge or separate from the screen the solid particles which may become attached thereto, or entrained therein, I may employ a series of beaters $k$, one of the ends of which are secured to a rock shaft $l$, by which they are elevated through the medium of rocker arm $m$, which is operated by a cam $n$ positioned on a power shaft $o$. The power shaft is driven by a pulley $p$ thereon through the medium of belt $q$. As will be readily understood, the beaters $k$ are intermittently raised or elevated by the cam mechanism, and then drop by gravity on the upper surface of the screen D, thereby dislodging any solid particles which may have collected thereon and keeping the screen from so filling up as to interfere with the proper exit of the outgoing air or gas current.

I have illustrated a glass covered peephole $r$ in one wall of the chamber whereby the operations interiorly of the chamber may be observed, with a view to properly regulating and controlling them. The dried material deposited on the bottom of the chamber is indicated at $s$.

From the foregoing description of the apparatus, its operations will be readily understood, but they may be described, briefly, as follows: The stratum of spray or vapor, which may be hot or cold, is projected across the evaporating chamber horizontally from the atomizer or vaporizer B, and the stratum of air or gas, either warm or cold, though generally warm, is projected horizontally across the chamber, and at right angles to the stratum of spray, from the air inlet opening or slot $f$. The air or gas then gradually rises, without material disturbance or eddying, and meeting the stratum of spray quickly absorbs the moisture therefrom, thence passes through the screen or filter D and escapes through the air or gas exit C. The bulk of the dry solid particles fall to the bottom of the chamber, almost immediately upon dehydration, while the remainder is caught or restrained by the screen or filter, and eventually finds its way also to the bottom of the chamber.

It will be understood that modifications may be made in the details of the process outlined without departing from the spirit of the invention, and that certain of the operations may be employed without using all of them together, it being understood that the invention is as broad as is commensurate with the appended claims.

Having thus fully described the invention, what I claim as new, and desire to secure by Letters Patent is:—

1. The process of evaporation which consists in introducing a stratum of spray into an evaporating chamber, introducing a stratum of dehydrating gas below the stratum of spray, whereby it passes upwardly through the latter, and compelling the current of moisture laden gas to pass through a screen sufficiently fine to exert a retarding influence on said current and separate therefrom the fine solid particles which have separated.

2. The process of evaporation which consists in introducing a stratum of spray into an evaporating chamber, introducing a stratum of a dehydrating gas below the stratum of spray, whereby it passes upwardly through the latter, and compelling the current of moisture laden gas, prior to its exit from the evaporating chamber, to pass through a screen sufficiently fine to exert a retarding influence on said current and to separate therefrom the solid particles which it may carry.

3. The process of evaporation which consists in introducing a stratum of spray into an evaporating chamber, in introducing a stratum of dehydrating gas below the stratum of spray, whereby it passes upwardly through the latter, and retarding the outgoing current of air.

4. The process of evaporation which consists in introducing a stratum of the material to be evaporated in the form of vapor or spray into an evaporating chamber, restraining said vapor or spray from rising beyond a certain predetermined height in the chamber, and causing a body of warm air to rise through said vapor or spray and absorb the moisture therefrom whereby the solid particles in the vapor or spray are separated.

5. The process of evaporation which consists in introducing into an evaporating chamber a stratum of the material to be evaporated in the form of a vapor or spray, causing a slowly moving body of air to pass upwardly through said vapor or spray and retarding the exit of said air from the evaporating chamber.

6. The process of evaporation which consists in introducing into an evaporating chamber a stratum of the material to be evaporated in the form of a vapor or spray, introducing a stratum of air into said chamber below the stratum of vapor, or spray, causing said stratum of air to rise through said vapor or spray and thereafter causing it to pass through a medium which tends to check the velocity of the air through the chamber and to keep it balanced therein.

7. The process of evaporation which consists in introducing into an evaporating chamber a substantially horizontal layer of spray projected from one side of said chamber, projecting a substantially horizontal layer of warm air beneath said layer of spray and in a path substantially at right angles to the direction of movement of the spray, causing said warm air to pass upwardly through said spray so as to abstract the moisture therefrom, and checking the upward movement of said air.

8. The process of evaporation which consists in introducing into an evaporating chamber a stratum of spray or vapor projected from one side of said chamber, projecting a substantial layer of warm air beneath said layer of spray and in a path substantially at right angles to the direction of movement of the spray, causing said warm air to pass upwardly through said spray, whereby it abstracts the moisture therefrom, and thereafter causing the effluent to pass out of the evaporating chamber in a direction substantially opposite to that in which the spray is projected.

9. The process of evaporation or concentration which consists in projecting a horizontal stratum of spray or vapor into an evaporating chamber, projecting a layer of a gaseous dehydrating agent below said layer of spray and in a path substantially at right angles thereto, causing said gaseous agent to pass upwardly through said spray so as to abstract the moisture therefrom, and checking the upward movement of said gaseous agent.

10. The process of evaporating substances in solution, suspension, or emulsion, which consists in spraying said solution into an evaporating chamber in the form of a stratum or layer substantially commensurate in size with the horizontal cross-section of the chamber, bringing a moving body of gaseous dehydrating agent into contact with said spray, and causing the effluent to pass out of the chamber in a direction substantially opposite to that in which the stratum or layer of spray is introduced.

In testimony whereof I have signed my name to this specification in the presence of two subscribing witnesses.

FREDERICK P. BERGH.

Witnesses:
 FRANK B. WILLARD,
 JAS. H. GRIFFIN.